United States Patent [19]

Yasunaga et al.

[11] Patent Number: 4,770,262

[45] Date of Patent: Sep. 13, 1988

[54] FOUR-WHEEL MOTOR VEHICLE WITH RIDING SADDLE SEAT

[75] Inventors: Osamu Yasunaga, Saitama; Toru Iwadate; Sigelu Tazima, both of Tokyo; Eiji Hosoya, Saitama; Takamasa Omino, Tokyo; Yoshinobu Itani, Saitama, all of Japan

[73] Assignee: Honda Giken Kogyo Kabushiki Kaisha, Tokyo, Japan

[21] Appl. No.: 44,612

[22] Filed: May 1, 1987

Related U.S. Application Data

[63] Continuation of Ser. No. 770,921, Aug. 30, 1985, abandoned.

[30] Foreign Application Priority Data

Aug. 31, 1984 [JP] Japan .......................... 59-131396[U]
Oct. 8, 1984 [JP] Japan .......................... 59-211047

[51] Int. Cl.⁴ .............................................. B60K 11/06

[52] U.S. Cl. ................................ 180/68.1; 123/41.65; 180/69.1; 180/229; 180/311

[58] Field of Search ...................... 180/229, 68.1, 68.2, 180/68.3, 68.4, 219, 211, 215, 311, 69.1; 123/41.65, 41.66, 44.49

[56] References Cited

U.S. PATENT DOCUMENTS

| | | | |
|---|---|---|---|
| 2,720,273 | 10/1955 | Johnson et al. | 180/229 |
| 3,727,712 | 4/1973 | Colloton | 180/68.1 |
| 4,019,595 | 4/1977 | Imai et al. | 180/229 |
| 4,237,996 | 12/1980 | Matsuda et al. | 180/229 |
| 4,426,960 | 1/1984 | Hart | 123/41.49 |
| 4,535,866 | 8/1985 | Shiga | 180/215 |
| 4,535,869 | 8/1985 | Tsutsumikoshi et al. | 180/215 |
| 4,687,069 | 8/1987 | Inomata et al. | 180/68.2 |

FOREIGN PATENT DOCUMENTS

| | | | |
|---|---|---|---|
| 560501 | 10/1923 | France | 180/229 |
| 600454 | 2/1926 | France | 123/41.65 |
| 56-73694 | 6/1981 | Japan . | |
| 58-136577 | 8/1983 | Japan . | |
| 59-122923 | 8/1984 | Japan . | |
| 59-146219 | 9/1984 | Japan . | |
| 131772 | 3/1951 | Sweden . | |

*Primary Examiner*—David M. Mitchell
*Attorney, Agent, or Firm*—Armstrong, Nikaido, Marmelstein & Kubovcik

[57] ABSTRACT

A four-wheel buggy with a riding saddle seat includes a vehicle frame, a pair of front wheels and a pair of rear wheels rotatably suspended from the vehicle frame and projecting laterally from the vehicle frame. An air-cooled engine is mounted on the vehicle frame substantially centrally in the longitudinal direction of the vehicle frame. The four-wheel buggy also includes a pair of foot steps, a driver's seat mounted on an upper portion of the vehicle frame and supported by the vehicle frame, a handlebar operatively connected to the vehicle frame for steering the front wheels, and a body cover attached to the vehicle frame. The four-wheel buggy further includes a cooling fan unit mounted on the vehicle frame and including a fan and a drive unit for rotating the fan, and a control system for controlling the drive unit. The cooling fan unit is disposed in front of the engine for directing air from the cooling fan unit toward the engine. The four-wheel buggy has sufficient engine cooling performance while it runs at low speeds.

9 Claims, 6 Drawing Sheets

26
34
33
13
32
35
18
19

111
126
103
109
123
121
127
131
132
133
141
134
113
144
122
124
107
102
A
116

132
113
133
116
144
121
131
141
127
C
123
132
113
133
116

102
114
105
105
106
106
107
107
108
156
155
151
144
104
109
156
147
103
141
145

Cs
123
122
123a
123a
121
θ
109
X
142
144
151
S
S
148
152
149
107
157
153
154
147
156
143
141
103

FOUR-WHEEL MOTOR VEHICLE WITH RIDING SADDLE SEAT

This application is a continuation of application Ser. No. 770,921 filed Aug. 30, 1985, now abandoned.

BACKGROUND OF THE INVENTION

The present invention relates to a four-wheel motor vehicle with a riding saddle seat, and more particularly to such a four-wheel motor vehicle called a "buggy" having four wheels provided with low-pressure balloon tires.

There have been used four-wheel motor vehicles with riding saddle seats, comprising a frame, a pair of front wheels and a pair of rear wheels rotatably suspended from the frame and provided with low-pressure balloon tires, an engine mounted on the frame, a body cover attached to the frame in covering relation to upper areas of the front and rear wheels and the engine, and a driver's riding saddle seat supported on the frame. Most of such buggies have similar body cover structures wherein relatively wide, lateral front fenders are joined to each other to provide a front panel which substantially entirely covers the top of the front portion of the vehicle. Lateral rear fenders are joined to each other to provide a rear panel having a wide covering area over the top of the rear portion of the vehicle. The front and rear panels are coupled together by a body cover portion extending to substantially cover the top of the engine. Since the fenders projecting laterally from the frame are located on each of the front and rear sides of the engine, the atmosphere around the engine is apt to remain stagant within the body cover. The four-wheel buggy with such a body cover arrangement is problematic in that when it is operated under a high load at a low speed for an extended period of time, the engine tends to be overheated because it is supplied with substantially no fresh air through the area between the two front wheels.

SUMMARY OF THE INVENTION

The present invention has been achieved in an attempt to solve the aforesaid drawback of the conventional four-wheel buggies.

According to the present invention, there is provided a four-wheel buggy with a riding saddle seat, comprising a vehicle frame, and front wheels rotatably suspended from the vehicle frame and projecting laterally from the vehicle frame. The front wheels are provided with balloon tires, respectively. A pair of rear wheels are rotatably suspended from the vehicle frame and project laterally from the vehicle frame. The wheels are provided with balloon tires, respectively. An engine is mounted on the vehicle frame substantially centrally in the longitudinal direction of the vehicle frame. A pair of foot steps are joined to the vehicle frame adjacent to the engine and project laterally from the vehicle frame. A driver's seat is mounted on an upper portion of the vehicle frame and supported by the vehicle frame. A handlebar is operatively connected to the vehicle frame for steering the front wheels. A body cover is attached to the vehicle frame and has front fenders substantially connected to each other and extending substantially over the front wheels, and has rear fenders substantially connected to each other and extending substantially over the rear wheels. A cooling fan unit is mounted on the vehicle frame and includes a fan and a drive means for rotating the fan, and a control system for controlling the drive means. The cooling fan unit is disposed in front of the engine for directing air from the cooling fan unit toward the engine.

The above and further objects, details and advantages of the present invention will become apparent from the following detailed description of preferred embodiments thereof, when read in conjunction with the accompanying drawings.

DESCRIPTION OF THE PREFERRED EMBODIMENTS

A four-wheel buggy with a riding saddle seat according to a first embodiment will be described with reference to FIGS. 1 through 5, and a four-wheel buggy with a riding saddle seat according to a second embodiment will be described with reference to FIGS. 6 through 10. In the first and second embodiment, a pair of front wheels 1, 113 and a pair of rear wheels 2, 116 are rotatably suspended from a vehicle frame 4, 102 and project laterally from the vehicle frame. Each of the front and rear wheels are provided with a low-pressure balloon tire.

Figure 1:
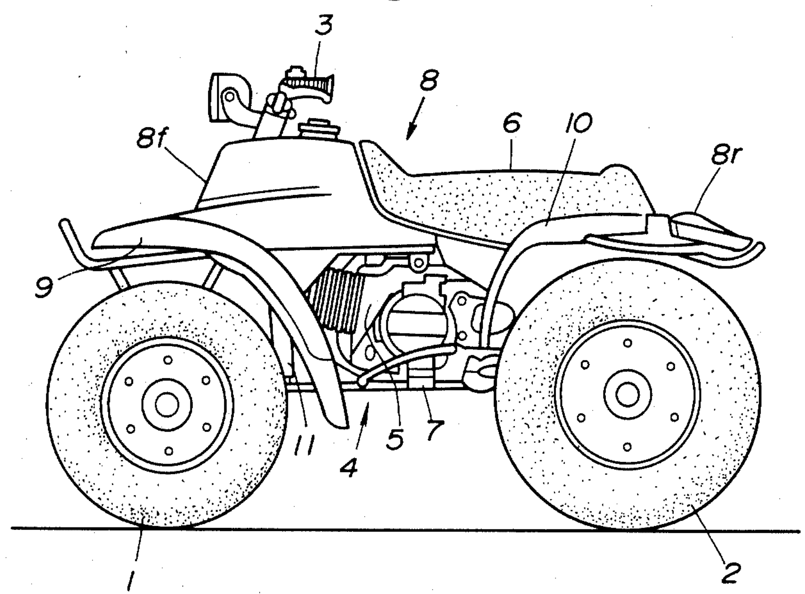
FIG. 1 is a side elevational view of a four-wheel buggy with a riding saddle seat according to a first embodiment of the present invention.
Figure 2:
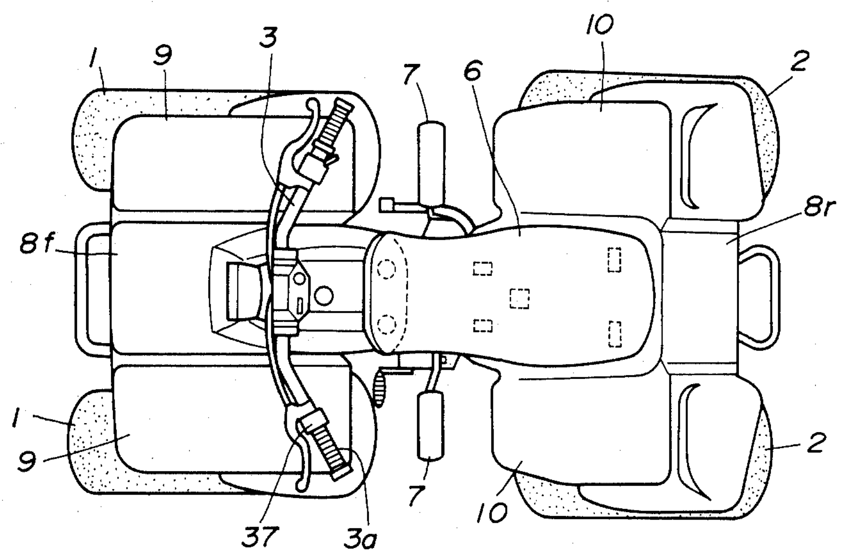
FIG. 2 is a plan view of the four-wheel buggy shown in FIG. 1.

As shown in FIGS. 1 and 2, the front wheels 1 are operatively coupled to a steering handlebar 3 as with ordinary motorcycles, so that the front wheels 1 can be steered by the handlebar 3. The four-wheel buggy has a vehicle frame 4 composed of a piping, as described later, and an internal combustion engine 5 supported centrally on the vehicle frame 4. The internal combustion engine 5 is of the air-cooled type in the illustrated embodiment. The driver is seated astride of a driver's saddle seat 6 with the driver's feet on foot steps or pegs 7 projecting laterally from a lower portion of the vehicle frame 4. In operation, the four-wheel buggy can be controlled by the driver who appropriately shifts his center of gravity laterally and back and forth to meet various vehicle and ground conditions in an effort to achieve stable and desired buggy maneuvers by utilizing his own body in combination with the buggy.

The top of the vehicle frame 4 is covered with a body cover 8 composed of a front cover member **8*f* extending a covering relation to the top of the front portion of the buggy body. A rear cover member 8r extends in a covering relation to the top of the rear portion of the buggy body. The front cover member 8f is integral with a pair of front fenders 9, 9 covering the front wheels 1, 1, respectively. The rear cover member 8r is integral with a pair of rear fenders 10, 10 covering the rear wheels 2, 3, respectively. The saddle seat 6 is disposed between the front and rear cover members 8f, 8r and serves as an intermediate joint of the body cover 8 between the front and rear cover members 8f, 8r.**

Since the top of the vehicle frame 4 is covered with the body cover 8, the upper half of the driver's body seated astride the saddle seat 6 is protected from muddy water and dust splashed or spattered upwardly by the wheels 1, 2. However, the heat emitted by the engine 5 would tend to remain stagnant within the space covered by the body cover 8. To prevent the engine heat from being trapped under the body cover 8, a cooling fan unit 11 is positioned in front of the engine 5 according to the embodiment of the present invention.

Figure 3:
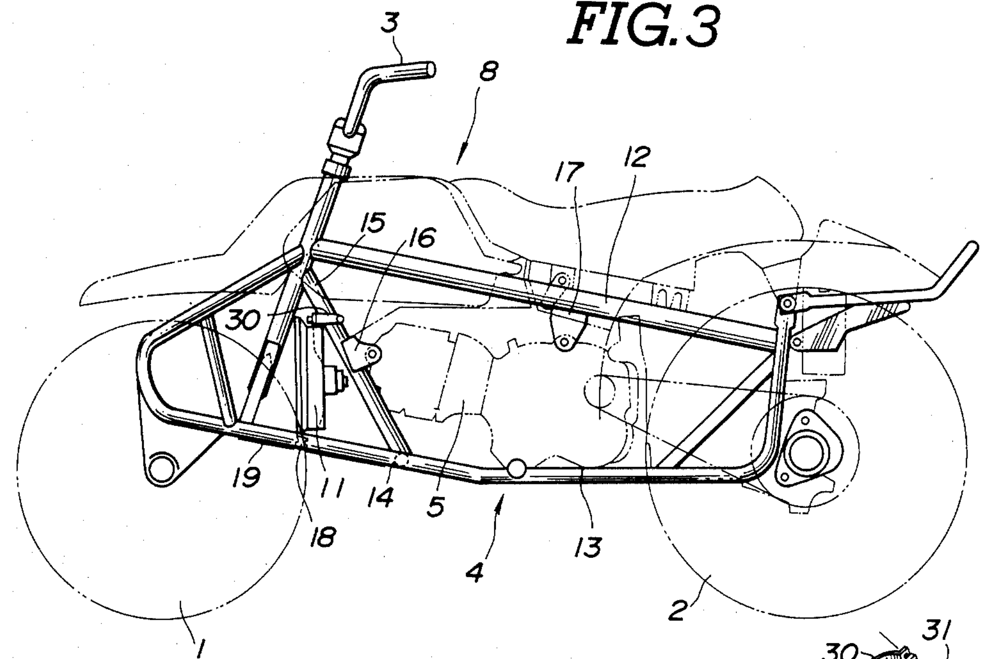
FIG. 3 is a side elevational view of the four-wheel buggy shown in FIG. 1.

FIG. 3 shows in detail the frame structure of the four-wheel buggy. The vehicle frame 4 has its main frame skeleton composed of a single straight main frame member 12 extending along the longitudinal axis of the buggy and inclined slightly downwardly in the rearward direction. The main frame member 12 is in the form of a pipe of a rectangular cross section. A pair of lower pipes 13 (only the lefthand lower pipe is shown in FIG. 3) of a round cross section extends forwardly from the front portion of the main frame member 12, then rearwardly in a substantially horizontal direction along the opposite sides of the buggy body, and upwardly so as to be joined to the rear portion of the main frame 12. The lower horizontal portions of the lower pipes 13 are interconnected by a cross pipe 14 having both ends welded to the lower horizontal portions of the lower pipes 13. A down pipe 15 extends as a tensioning member between the central portion of the cross pipe 14 and the joint where the main frame member 12 is joined to the lower pipes 13.

The engine 5 is mounted on the vehicle frame 4 substantially centrally in the longitudinal and transverse directions of the vehicle frame 4. The engine 5 is attached to the vehicle frame 4 by brackets 16, 17 fixed to the down pipe 16 and the main frame member 12, respectively. The cooling fan unit 11 disposed in front of the engine 5 is attached by bolts and nuts through rubber mounts to the down pipe 15 and a cross member 18 extending between the lower pipes 13. A guard plate 19 is bolted to the cross member 18 and extends longitudinally along the lower pipes 13 to protect the lower portion of the cooling fan unit 12 (see FIG. 5).

Figure 4:
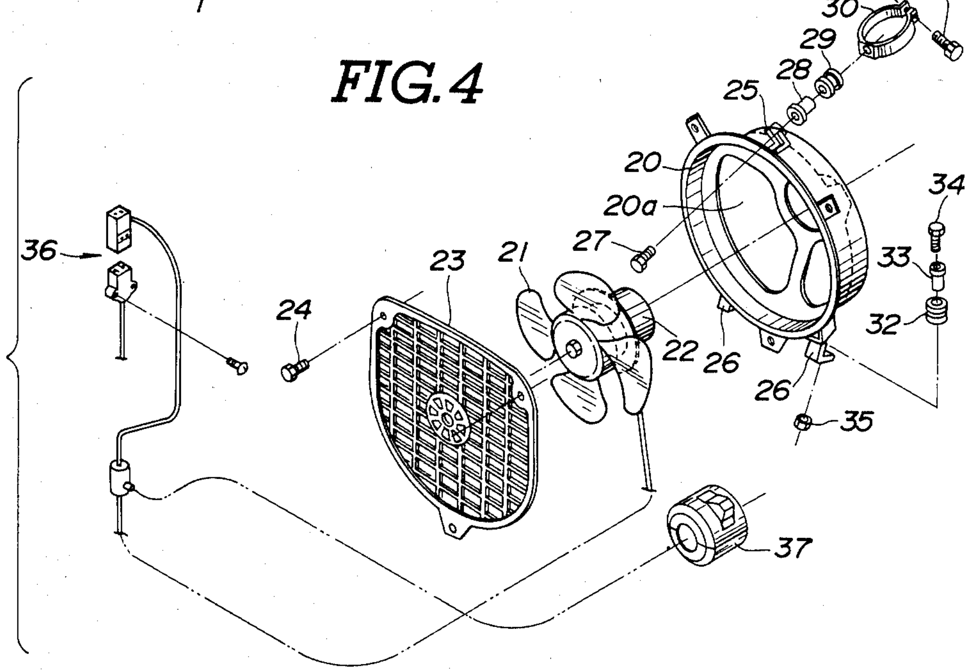
FIG. 4 is an exploded perspective view of a cooling fan unit on the four-wheel buggy shown in FIG. 1.
Figure 5:
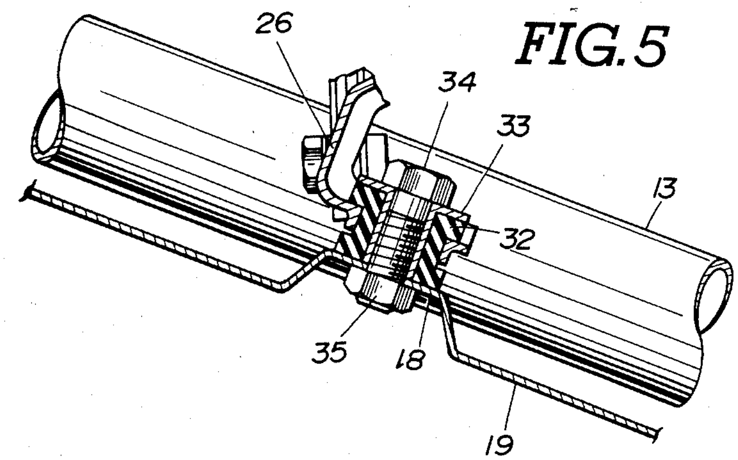
FIG. 5 is an enlarged cross-sectional view of an attachment structure for the cooling fan unit of FIG. 4.

As shown in FIG. 4, the cooling fan unit 11 comprises a shroud 20 and a fan 21 disposed in and circumferentially covered by the shroud 20. The shroud 20 has holes 20a through which air is drawn by the fan 21 and guided thereby rearwardly. The fan 21 is driven by an electric motor 22 coupled thereto. The shroud 20 has a front opening covered with a grid-like protector or filter 23 made of metal or synthetic resin and fastened to the shroud 20 by screws 24. The protector 23 serves to prevent foreign matter from entering the shroud 20.

The shroud 20 has a single stay 25 on its upper central portion and a pair of laterally spaced stays 26 on its lower portion. The upper stay 25 is connected by a bolt 27 to a fastening member 30 through a collar 28 and a mounting rubber member 29. As illustrated in FIG. 3, the fastening member 30 embraces the down pipe 15 and is fastened thereto by a screw 31. Each of the lower stays 26 is attached by a bolt 34 and a nut 35 to the cross member 18 through a mounting rubber member 32 and a collar 33, as shown in greater detail in FIG. 5.

The electric motor 22 is electrically connected by a connector 36 to a generator (not shown) driven by the engine 5 so that the electric motor 22 can be supplied with electric power from the generator. The circuit by which the electric motor 22 is connected to the generator includes a manually operated switch 37 mounted on a grip 3a of the handlebar 3 and electrically connected to the electric motor 22, as shown in FIG. 2, so that the supply of electric power from the generator to the electric motor 22 can be controlled by the driver through the manually operated switch 37 while he is driving the buggy. Alternatively, a thermostatic switch may be inserted in the circuit for automatically starting or stopping the electric motor 22 dependent on the temperature in the vicinity of the engine 5.

Figure 6:
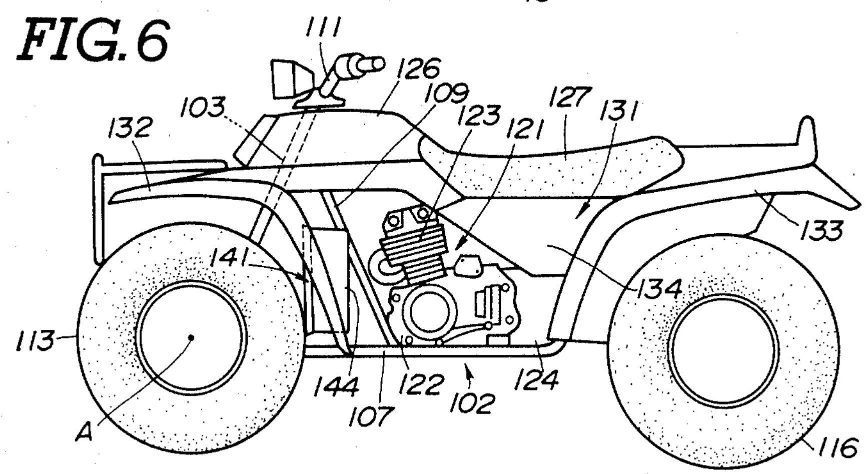
FIG. 6 is a side elevational view of a four-wheel buggy with a riding saddle seat according to a second embodiment of the present invention.
Figure 7:
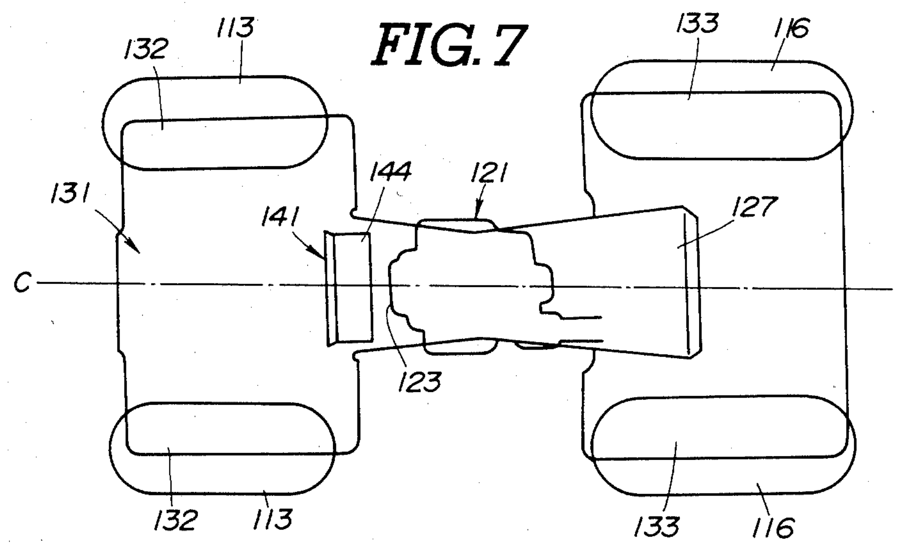
FIG. 7 is a schematic plan view of the four-wheel buggy of FIG. 6, showing the positions of an engine and a cooling fan unit.
Figure 8:
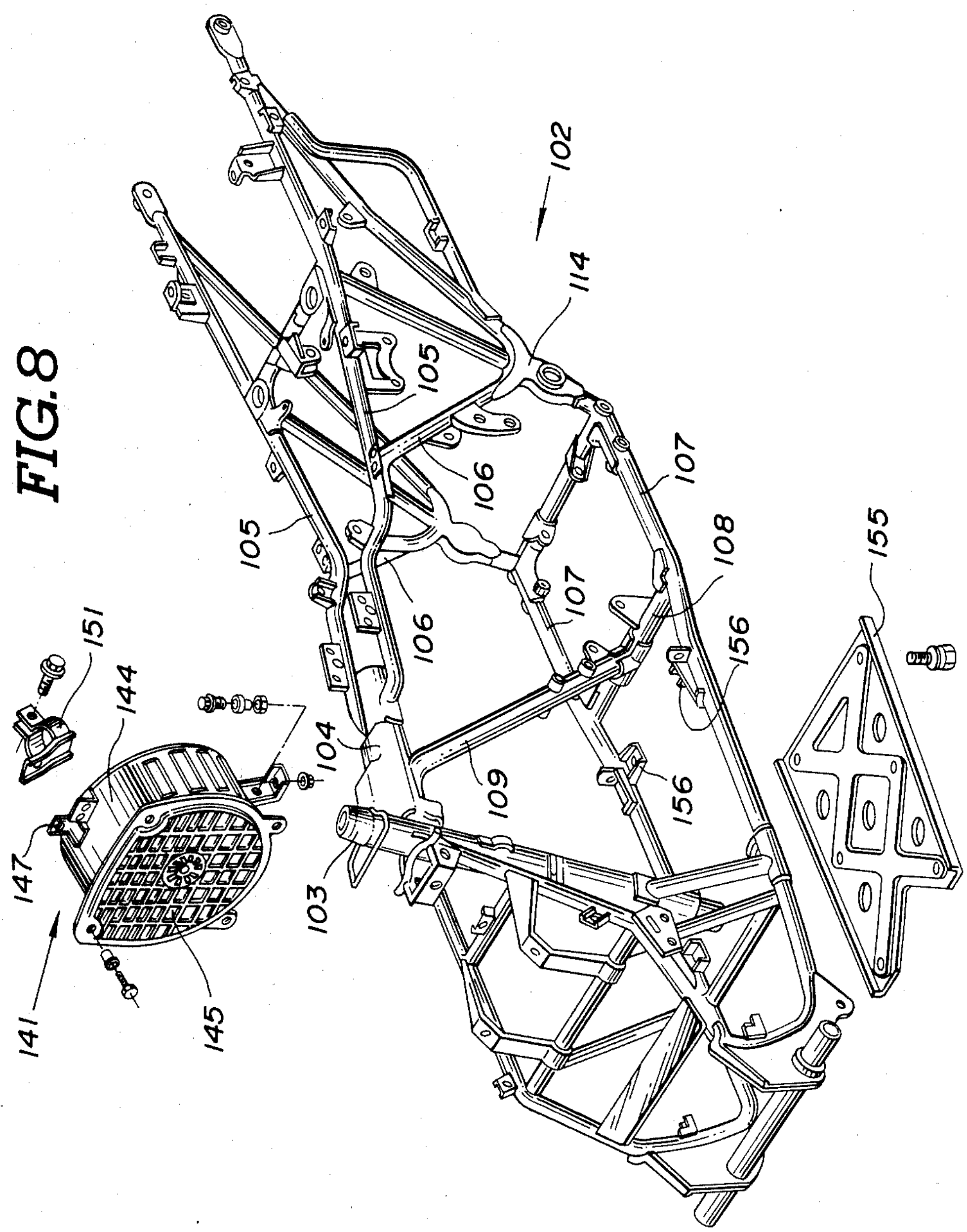
FIG. 8 is an exploded perspective view of the frame of the four-wheel buggy illustrated in FIG. 6.

FIGS. 6 through 10 illustrate a second embodiment of the present invention. A four-wheel buggy with a riding saddle seat according to the second embodiment includes a vehicle frame 102 which, as shown in FIG. 8, has a head pipe 103 and a main pipe 104 with its front end coupled to the upper end of the head pipe 103. A pair of laterally spaced seat pipes 105 has front ends connected to the rear end of the main pipe 104 and intermediation portions joined to the upper ends of a pair of center pipes 106. The center pipes 106 have lower ends coupled to the rear ends of a pair of lower pipes 107, the intermediate portions of which are interconnected by a cross pipe 108 that is coupled to the head pipe 103 by a down pipe 109. The lower pipes 107 have front portions curved upwardly and then extending upwardly and rearwardly, with distal ends joined to the upper end of the head pipe 103.

Figure 9:
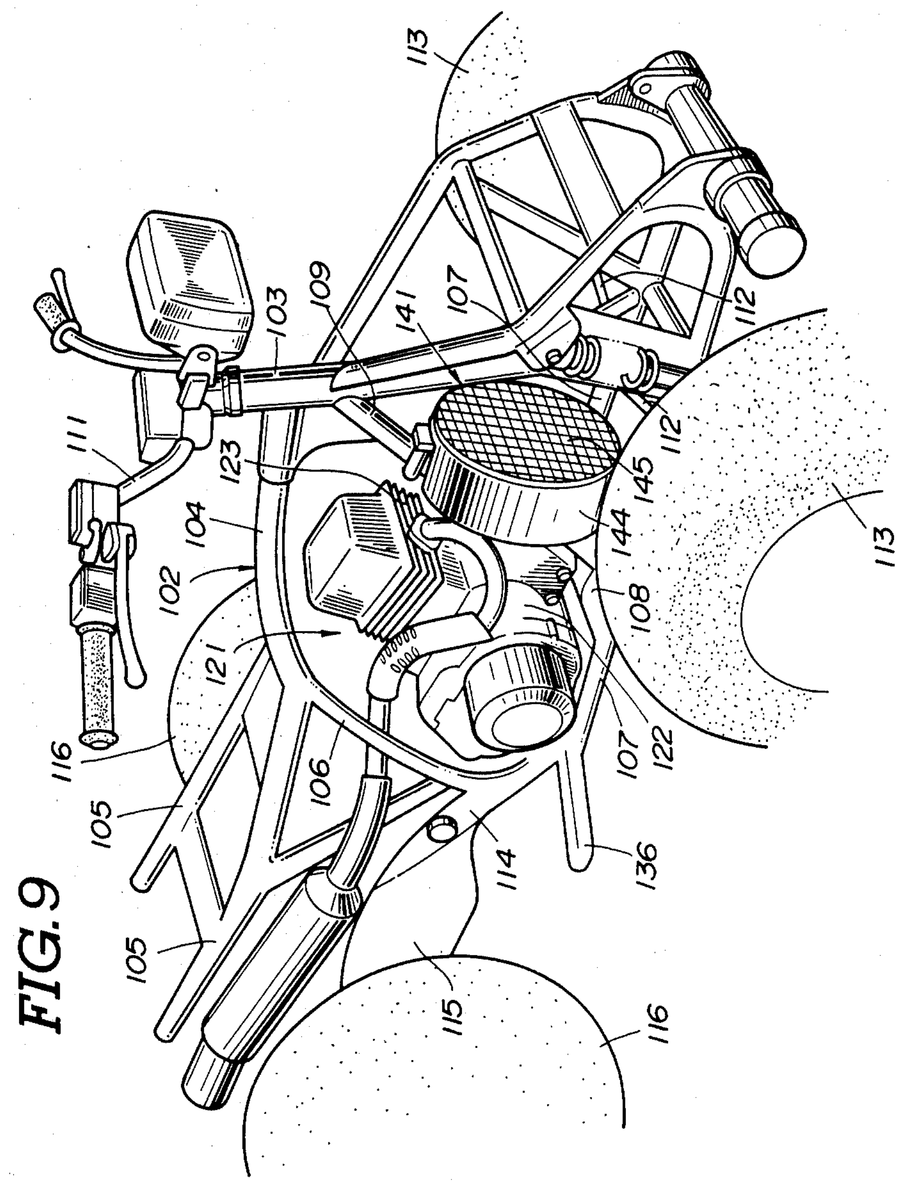
FIG. 9 is a fragmentary perspective view of the four-wheel buggy of FIG. 6, with a body cover removed from illustration.

As shown in FIG. 9, a steering handlebar 111 is attached to the upper end of a steering shaft (not shown) extending through the head pipe 103. The head pipe 103 has a lower end positioned at substantially the same level as that of the lower pipes 107. The steering shaft has a lower end projecting downwardly from the lower end of the head pipe 103 and operatively coupled to ends of tie rods 112 by link arms (not shown). The other ends of the tie rods 112 are coupled to knuckles (not shown), respectively, which support the axles of front wheels 113 rotatably suspended from the opposite sides of the front portion of the vehicle frame 102.

A swing arm 115 has a front end pivotally supported on brackets 114 fixed to and projecting rearwardly from the junctions where the lower ends of the center pipes 106 are joined to the rear ends of the lower pipes 107. The axle (not shown) of a pair of rear wheels 116 are supported on the rear end of the swing arm 115.

An engine 121 is supported on the frame 102 and positioned in a space surrounded by the main pipe 104, the center pipes 106, the lower pipes 107, and the down pipe 109. As illustrated in FIG. 7, the engine 121 is substantially aligned with the longitudinal central axis C of the buggy body. The engine 121 has a crankcase 122 and a cylinder 123 disposed on the front portion of the crankcase 122. The cylinder 123 having cooling fins 123a is slightly tilted forwardly. A transmission case 124 coupled to the rear end of the crankcase 122 has an output shaft (not shown) extending rearwardly and operatively coupled to the axle of the rear wheels 116 by means of a nonillustrated power transmission system.

As shown in FIG. 6, a fuel tank 126 is supported on the main pipe 104, and a driver's saddle seat 127 is supported on the seat pipes 105. The vehicle frame 102 is covered at its top with a body cover 131 including a pair of front fenders 132 and a pair of rear fenders 133. The front and rear fenders 132, 133 are interconnected by an intermediate side cowl 134 extending below the fuel tank 126 and the driver's saddle seat 127. The engine 121 is exposed below the side cowl 134. Two foot steps or pegs 136 (only one shown in FIG. 9) project laterally from the lower pipes 107 near the engine 121 to allow the driver to put his feet on the foot steps 136.

Figure 10:
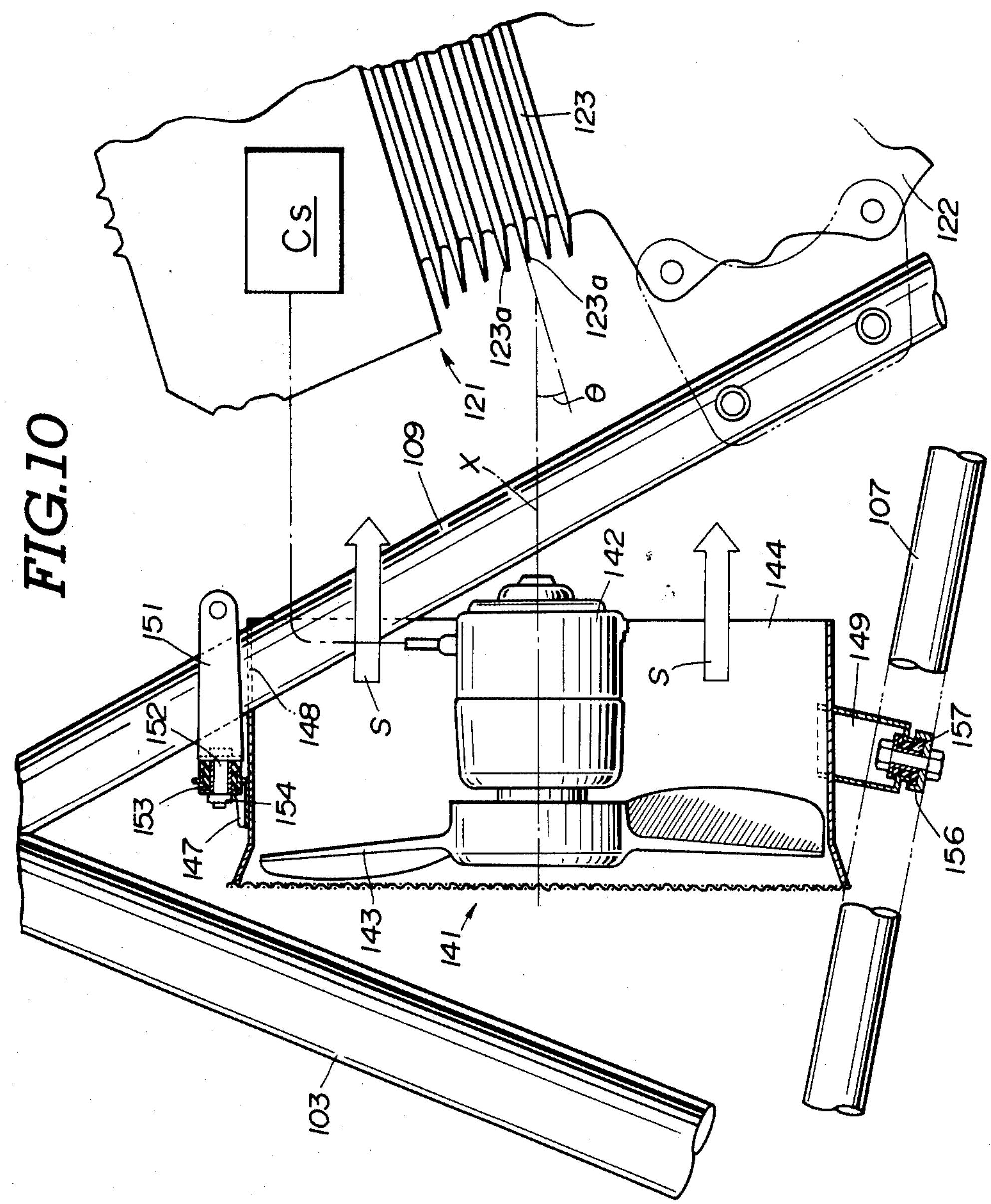
FIG. 10 is a sectional side elevational view of a cooling fan unit on the four-wheel buggy shown in FIG. 6.

As shown in FIG 10, a cooling fan unit 141 is positioned in a triangular space, as seen in side elevation, surrounded by the head pipe 103, the down pipe 109, and the lower pipes 107.

The cooling fan unit 141 is composed of a fan 143, an electric motor 142 coupled to the fan 143 for rotating the fan 143, and a tubular shroud 144 housing the fan 143 and the electric motor 142 therein. A grid or filter 145 (FIG. 9) is attached to the front end of the shroud 144. The grid 145 may be replaced with a wire net. The shroud 144 has an upper central portion supported by the down pipe 109 and lower side portions supported by the lower pipes 107. The cooling fan unit 141 as thus supported is positioned in front of the engine 121 and spaced a suitable distance therefrom.

More specifically, the upper portion of the down pipe 109 is embraced by a metal band 151 with its rear portion fastened by a bolt. The metal band 151 supporting on its front portion a bolt 152 surrounded by a rubber bushing 153. A bracket 147, fixed to the upper central portion of the shroud 144, is fitted over the rubber bushing 153, and a nut 154 is threaded and tightened over the bolt 152. The shroud 144 has a recess 148 defined in the rear edge of the upper central portion of the shroud 144, with the down pipe 109 extending through the recess 148.

A guard plate 155 (FIG. 8) is attached to the front portions of the lower pipes 107 for protecting the shroud 144. As illustrated in FIG. 10, stays 149 are fixed to and depend from the lower side portions of the shroud 144. The stays 149 are fastened by bolts and nuts to stays 156 with rubber bushings 157 interposed therebetween. The stays 156 are attached to the lower pipes 107, respectively.

The cooling fan unit 141 is substantially aligned with the longitudinal central axis C (FIG. 7) of the buggy body. The cooling fan unit 141 is located in front of the engine 121 and rearwardly of the position A of the axles of the front wheels 113. As indicated by the arrows S in FIG. 10, air streams forced by the cooling fan unit 141 flow along the axis X of the cooling fan unit 141 or the fan 143 toward the engine 121. The cooling fins **123*a* on the engine cylinder 123 extending parallel to each other. The cooling fan unit 141 and the cooling fins 123*a* are relatively positioned such that the axis X of the cooling fan unit 141 extend at an angle $\theta$ to the cooling fins 123*a***.

The four-wheel buggy also has a generator for supplying electric power to the electric motor 142, and a control system (shown schematically as a block Cs in FIG. 10) for controlling the supply of electric power from the generator to the electric motor 142. The generator is of a known design and is operatively coupled to the engine 121 for being driven thereby. The control system Cs comprises an oil-temperature sensor for detecting the temperature of engine oil. A switch is connected to the oil-temperature sensor for turning on or off the electric power supplied from the generator to the electric motor 142 dependent on the temperature of engine oil. The cooling fan unit 141 is controlled by the control system Cs so that the electric motor 142 will be energized to rotate the fan 143 when the engine oil reaches a prescribed temperature.

Therefore, when the prescribed oil temperature is reached, the engine 121 is forcibly cooled by air flowing through the area between the front wheels 113 and also by the cooling fan unit 141 positioned in path of air through the area between the front wheels 113. As a result, the engine cooling performance is sufficiently obtained especially when the buggy runs at low speeds. With the engine 121 well cooled, hot air is prevented from remaining stagnant within the side cowl 134 of the body cover 131 for thereby eliminating unwanted effects of heat on the driver seated on the driver's saddle seat 127.

Since the cooling fan unit 141 is located behind the head pipe 103, the space between the head pipe 103 and the engine 121 can effectively be utilized for installing the cooling fan unit 141 therein without physical interference with the steering mechanism and the suspension mechanism. The cooling fan unit 141 disposed in front of the engine 121 can provide a sufficient amount of cooling air to be supplied to the engine 121.

With the arrangement of the present invention, as described above, the cooling fan unit is positioned in front of the engine and behind the axles of the front wheels for forcibly and effectively cooling the engine. Therefore, the engine cooling performance at low buggy speeds, which has been poor with conventional four-wheel buggies, can be satisfactorily improved.

Although there have been described what are at present considered to be the preferred embodiments of the present invention, it is understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A four-wheel buggy with a riding saddle seat, comprising:

a vehicle frame including at least a main frame member extending along a longitudinal axis of the buggy, a pair of lower parallel pipes as a lower frame member extending below said main frame member, a down pipe extending rearwardly downwardly from said main frame member to said lower frame member, and a head pipe coupled to the front end of said main frame and extending forwardly downwardly from the front end of said main frame member to said lower frame member, said lower frame member, said down pipe, and said head pipe defining a triangular space therein;

a pair of front wheels rotatably suspended from said vehicle frame and projecting laterally from said vehicle frame, said front wheels being provided with ballon tires, respectively;

a pair of rear wheels rotatably suspended from said vehicle frame and projecting laterally from said vehicle frame, said rear wheels being provided with balloon tires, respectively;

a air-cooled engine disposed behind said down pipe and between said main frame member and said lower frame member;

a driver's seat mounted on an upper portion of said vehicle frame and supported by said vehicle frame;

a handlebar connected to said vehicle frame for steering said front wheels;

a body cover attached to said vehicle frame and having front fenders substantially connected to each other and extending substantially over said front wheels, and rear fenders substantially connected to each other and extending substantially over said rear wheels;

a cooling fan unit including a fan and drive means for rotating said fan;

said vehicle frame further including a guard plate attached to said lower frame member and extending longitudinally therealong so as to form a base of said triangular space; and said cooling fan unit being disposed in said triangular space and attached to said down pipe for being protected by said guard plate therebelow and for directing air from the cooling fan unit toward said engine.

2. A four-wheel buggy according to claim 1, wherein said body cover has an intermediate portion interconnecting said front and rear fenders, said engine being positioned between said front and rear fenders, said intermediate portion of said body cover extending in a covering relation to the a of said engine, said cooling fan unit being disposed between said front fenders.

3. A four-wheel buggy according to claim 1, wherein said handlebar has a grip, said drive means including and electric motor, and a control means including an electric switch mounted on said grip and electrically connected to said electric motor for controlling the supply of electric power to said electric motor.

4. A four-wheel buggy according to claim 1, wherein a shroud of said cooling fan unit includes first stays on its upper and lower portions thereof, and said down pipe and lower frame member include second stays thereon, respectively, said cooling fan unit being connected between said down pipe and said lower frame member in said triangular space by coupling said first and second stays together.

5. A four-wheel buggy according to claim 1, further comprising a pair of foot steps jointed to said vehicle frame adjacent to said engine and projecting laterally from said vehicle frame.

6. A four-wheel buggy with a riding saddle seat, comprising:

a vehicle frame including at least a main frame member extending along a longitudinal axis of the buggy, a pair of lower parallel pipes as a lower frame member extending below said main frame member, a down pipe extending rearwardly downwardly from said main frame member to said lower frame member, and a head pipe coupled to the front end of said main frame and extending forwardly downwardly from the front end of said main frame member to said lower frame member, said lower frame member, said down pipe and said head pipe defining a triangular space therein;

a pair of front wheels rotatably suspended from said vehicle frame and projecting laterally from said vehicle frame, said front wheels being provided with balloon tires, respectively;

a pair of rear wheels rotatably suspended from said vehicle frame and projecting laterally from said vehicle frame, said rear wheels being provided with balloon tires, respectively;

a air-cooled engine disposed behind said down pipe and between said main frame member and said lower frame member, said engine having cooling fins;

a driver's seat mounted on an upper portion of said vehicle frame and supported by the vehicle frame;

a steering shaft extending through said head pipe and connected to said front wheels for steering thereof;

a body cover attached to said vehicle frame and having front fenders substantially connected to each other and extending substantially over said front wheels, and rear fenders substantially connected to each other and extending substantially over said rear wheels;

a cooling fan unit including a fan, drive means for rotating said fan and a tubular shroud housing the fan and the drive means therein said tubular shroud having a recess defined in a rear edge of an upper central portion thereof;

said vehicle frame further including a guard plate attached to said lower frame member and extending longitudinally therealong so as to form a base of said triangular space; and said cooling fan unit being disposed in said triangular space and supported by said down pipe which is extending through said recess of said shroud for spacing a suitable distance from said engine and for directing air from the cooling fan unit toward said engine, said cooling fan unit having its axis extending at an angle to said cooling fins of said engine.

7. A four-wheel buggy according to claim 6, wherein said shroud of said cooling fan unit includes first stays on its upper and lower portions thereof, and said down pipe and lower frame member include second stays thereon, respectively, said cooling fan unit being connected between said down pipe and said lower frame member in said triangular space by coupling said first and second stays together.

8. A four-wheel buggy according to claim 6, further comprising a pair of foot steps joined to said vehicle frame adjacent to said engine and projecting laterally from said vehicle frame.

9. A four-wheel buggy with a riding saddle seat, comprising:

a vehicle frame;

a pair of front wheels rotatably suspended from said vehicle frame and projecting laterally from said vehicle frame, said front wheels being provided with balloon tires, respectively;

a pair of rear wheels rotatably suspended from said vehicle frame and projecting laterally from said vehicle frame, said rear wheels being provided with balloon tires respectively;

an air-cooled engine mounted on said vehicle frame substantially centrally in the longitudinal direction of said vehicle frame;

a pair of foot steps joined to said vehicle frame adjacent to said engine and projecting laterally from said vehicle frame;

a driver's seat mounted on an upper portion of said vehicle frame and supported by said vehicle frame;

a handlebar operatively connected to said vehicle frame for steering said front wheels, said handlebar having a grip;

a body cover attached to said vehicle frame and having front fenders substantially connected to each other and extending substantially over said front wheels, and rear fenders substantially connected to each other and extending substantially over said rear wheels;

a cooling fan unit mounted on said vehicle frame and including a fan and drive means for rotating said fan, said drive means comprising an electric motor;

control means for controlling said drive means, said control means including an electric switch mounted on said grip and electrically connected to said electric motor for controlling the supply of electric power to said electric motor; and said cooling fan unit being disposed in front of said engine for directing air from the cooling fan unit toward said engine.

* * * * *